(12) United States Patent
Tsuji et al.

(10) Patent No.: US 7,824,167 B2
(45) Date of Patent: Nov. 2, 2010

(54) CLAMPING MACHINE

(75) Inventors: Makoto Tsuji, Yamato (JP); Hiroshi Yokoyama, Ebina (JP); Shinya Itani, Zama (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/152,767

(22) Filed: Jun. 15, 2005

(65) Prior Publication Data
US 2005/0281908 A1 Dec. 22, 2005

(30) Foreign Application Priority Data
Jun. 17, 2004 (JP) .............................. 2004-179025

(51) Int. Cl.
B29C 45/67 (2006.01)
(52) U.S. Cl. ...................................... 425/190; 425/595
(58) Field of Classification Search ................. 425/190, 425/589, 590, 595
See application file for complete search history.

(56) References Cited

U.S. PATENT DOCUMENTS

| 3,465,387 | A | * | 9/1969 | Allard et al. | 425/590 |
|---|---|---|---|---|---|
| 3,801,256 | A | * | 4/1974 | Farrell | 425/595 |
| 3,951,579 | A | * | 4/1976 | Myers et al. | 425/190 |
| 4,025,264 | A | * | 5/1977 | Hehl | 425/190 |
| 4,106,885 | A | * | 8/1978 | Poncet | 425/595 |
| 4,504,208 | A | * | 3/1985 | Kurumaji et al. | 425/595 |
| 4,874,309 | A | * | 10/1989 | Kushibe et al. | 425/595 |
| 4,948,358 | A | * | 8/1990 | Kushibe et al. | 425/589 |
| 5,320,517 | A | * | 6/1994 | Hirata et al. | 425/595 |
| 5,417,913 | A | * | 5/1995 | Arend | 425/595 |

(Continued)

FOREIGN PATENT DOCUMENTS

JP 60-82309 * 5/1985

(Continued)

OTHER PUBLICATIONS

Notification of Reason for Rejection for Japanese Patent Application 2004-179025 dated Jul. 28, 2009.

*Primary Examiner*—James Mackey
(74) *Attorney, Agent, or Firm*—Pillsbury Winthrop Shaw Pittman, LLP

(57) ABSTRACT

A new clamping machine is disclosed, which can perform a straight-hydraulic mold clamping and a tie-bar drawing-out operation in a reduced working space, and enables a shortened mold exchanging time, by effecting retraction of a movable die plate and a tie-bar drawing-out operation simultaneously. In order to draw out tie bars 18 from a fixed die plate 10 only when molds are exchanged, annular pistons 36, which construct mold clamping cylinders in the fixed die plate, are provided. Abutting each piston, a pair of half nuts 48A, 48B are arranged and driven to engage with an engagement portion 18A provided at one end of each tie bar on the side of the fixed die plate, usually, other than during the drawing out operation. A relative position of each tie bar to the half nuts is set to be able to engage with the half nuts when a right end face of the tie bar contacts with the stopper plate 46. When pressure for clamping molds is increased during such engagement, the annular pistons are driven to transmit a force, for performing an initial operation, to the tie bars.

10 Claims, 8 Drawing Sheets

U.S. PATENT DOCUMENTS

| | | | |
|---|---|---|---|
| 5,618,487 A * | 4/1997 | Hettinga | 425/595 |
| 6,468,449 B1 * | 10/2002 | Fujikawa | 425/595 |
| 6,613,262 B1 * | 9/2003 | Arend | 425/190 |
| 6,821,104 B2 | 11/2004 | Kubota et al. | |

FOREIGN PATENT DOCUMENTS

| | | | |
|---|---|---|---|
| JP | 1263007 | | 10/1989 |
| JP | 5-7419 U | | 2/1993 |
| JP | 6-106542 A | | 4/1994 |
| JP | 7-148807 | * | 6/1995 |
| JP | 8-72113 | * | 3/1996 |
| JP | 8-117959 | * | 5/1996 |
| JP | 2002-086452 A | | 3/2002 |
| JP | 2003-334648 A | | 11/2003 |

* cited by examiner

① CLOSING MOLDS AT HIGH SPEED

② CLOSING MOLDS AT HIGH SPEED

③ CLAMPING MOLDS AT LOWER PRESSURE

④ ADJUSTING MOLDS THICKNESS →
HALF NUT 32A, 32B CLOSED

⑤ CLAMPING MOLDS

⑥ SEPARATING MOLDS

⑦ OPENING AT LOWER SPEED →
HALF NUT 32A, 32B OPENED

⑧ OPENING AT HIGHER SPEED

⑨ OPENING AT LOWER SPEED

⑩ STOPPING MOLDS OPENING

⑪ EJECTING MOLDED ARTICLE

⑫ STARTING TO PULL OUT TIE BARS
HALF NUT 48A, 48B OPENED

⑬ FINISHED PULLING OUT TIE BARS

CLAMPING MACHINE

CROSS REFERENCE TO RELATED APPLICATIONS

This application is based upon and claims the benefit of priority from Japanese Patent Application No. 2004-179025, filed in Japan on Jun. 17, 2004.

BACKGROUND OF THE INVENTION

1. Field of the Invention

The present invention relates to a clamping machine, such as die-cast machines or injection molding machines (hereinafter, referred to as molding machines), and particularly to a clamping machine which effects a drawing-out operation of tie bars on exchanging molds using a driving mechanism of movable die plates.

2. Prior Art

In clamping machines, such as die-cast machines, tie bars may affect both new and used molds when they are exchanged. In particular, in the case of die-cast machines, one or more core cylinders are often attached to a mold in the horizontal direction. In such a case, tie bars should be drawn out from fixed die plates, prior to exchange of molds, such that the tie bars will have no influence on the core cylinder.

In conventional clamping machines, special hydraulic cylinders are provided for drawing out the tie bars. However, the hydraulic cylinder of this type has a relatively long cylinder stroke, and thus tie bars are to be moved behind to a distance. Therefore, a predetermined space accommodating the movement should be provided behind the machine. In the case of large-sized die-cast machines, in addition to a long stroke of the special hydraulic cylinder, heavy tie bars themselves are also responsible for lengthening their moving time. Moreover, since the tie bars should be drawn into fixed fie die plates again after new molds are attached to the device, it should take a considerably long time to carry out the whole cycle for exchanging molds.

In conventional clamping machines, devices which are driven by a toggle link mechanism have been widely used. In the case of die-cast machines provided with such a toggle mechanism, however, a link housing is arranged for adjusting the mold thickness to be carried out after exchanging new and used molds. Thus, the entire length of these machines should be considerably long. Accordingly, while the clamping machines of such a toggle link type have a merit in that both of the make-and-break (opening-and-closing) operation and the clamping operation of the molds can be performed by a toggle link mechanism, another type of devices, which include a driving mechanism for the opening-and-closing operation and another driving mechanism for the clamping operation in place of the toggle link mechanism, have emerged recently.

In this case, a clamping cylinder for the clamping operation is arranged on the side of the fixed die plate or of the movable die plate. Since the clamping cylinder cannot accommodate adjustment of the mold thickness alone, various mechanisms have been proposed for driving the clamping operation related to adjustment of the mold thickness.

However, we have not known so far any clamping devices in which efficiency of the above-described drawing-out operation of tie bars and simplicity of the mechanisms are well considered.

Among clamping devices including a clamping cylinder arranged on the side of the fixed die plate, an example of the prior art, which enables tie bars to be drawn out with ease using a make-and-break operation of the movable die plate will be explained with reference to Japanese Patent No. 1996-5060 (TOKUKOUHEI No. 8-5060).

FIGS. 7 and 8 illustrate a clamping machine disclosed in Japanese Patent No. 1996-5060, respectively. FIG. 7 is a front view of a clamping machine, showing a state in which tie bars are drawn out from a fixed die plate, and FIG. 8 is a view of the clamping machine in FIG. 7, showing a state immediately prior to closing molds.

In FIGS. 7 and 8, 201 is a fixed die plate which is fixed to one end of a base (not shown), and to which a fixed mold 202 is attached. 203 is a movable die plate which is mounted to the base movably in both front and back directions, and to which a movable mold 204 is attached. 205 are tie bars, and one end of each tie bar is fixed to the movable die plate 203 with a nut 207. The other end of each tie bar 205 includes a screw portion 206 which mates or engages with half nuts 208. On the rear side of a mold attachment surface of fixed die plate 201 a half nut attachment plate 210 is attached, and four half nuts 208 are provided corresponding to each tie bar 205 across the attachment plate 210. Each half nut 208 is opened and closed, for example, by an effect of a hydraulic cylinder 209 or the like, and is constructed to mate with the corresponding screw portion 206 of the tie bar. The half nut attachment plate 210 is attached to the fixed die plate 201 so as to enable the horizontal movement of the plate 210 in the same direction as the moving direction of movable die plate 203 using a linear guide 211 at a lower surface of the fixed die plate 201 and a linear guide 212 (a bush or the like) at a side surface thereof.

The linear guide 212 is composed of a guide bar 213 fixed to the half nut attachment plate 210, a bush 214 fixed to the fixed die plate 201, and a compression spring 215 attached between the guide bar 213 and the bush 214. The compression spring applies a force to the half nut attachment plate 210 such that it is always pulled toward the fixed die plate 201.

216 is a mold thickness adjusting device to adjust the tie bar screw 206 and the corresponding screws of half nuts 208 to always take positions for enabling their mating even when the thickness of the mold is changed. A pulse motor 220, to which a screw 218 is connected directly, is attached rotatably to a rack 217, and the rack 217 is connected to a bottom face of the movable die plate 203. 221 is a body holding a nut 219, and a rod 222 projecting toward the fixed dies plate 201 is fixed to the body 221.

230 is a cylinder for opening and closing molds, in which a cylinder body is attached to the fixed die plate 201, while a distal end of the cylinder rod is attached to the movable die plate 203, so that the movable die plate 203 can be moved in both front and back directions. 231 is a cylinder for increasing clamping pressure, which is incorporated in the fixed die plate 201. 232 is a ram which is moved in the right direction in FIG. 6 by applying pressurized oil into an oil chamber 234 when the clamping pressure is increased, and pushes the half nut attachment plate 210 at its distal end 233. In this case, the half nuts 208 mate with the corresponding screw 206 of the die bar, thereby to generate a clamping force. 235 is also an oil chamber.

Next, the operation of this clamping machine is explained.

When pressurized oil is supplied to the oil chamber on the rod side of the mold opening-and-closing cylinder 230, the movable die plate 203 advances toward the fixed die plate 201 to perform a mold closing operation. FIG. 8 illustrates a state immediately prior to closing molds when a distal end of the rod 222 of mold thickness adjusting device 216 contacts with the half nut attachment plate 210. The mold closing operation further continues from this state, and the distal end of the rod 222 pushes the half nut attachment plate 210 so that the attachment plate 210 is moved in the horizontal direction following the guide of linear guides 211, 212. When the fixed mold 202 and the movable mold 204 mate with each other completely, the mold closing operation is completed. Then, the horizontal movement of the half nut attachment plate 210 is stopped.

In FIG. 8, threads of the tie bar screw 206 and those of the half nuts 208 are shown to have substantially the same positions, so that the half nuts 208 cannot be closed because both of the thread portions meet on closing the half nuts in such a state. A distance that the half nut attachment plate 210 moves from a time when the rod 222 contacts with the half nut attachment plate 210 to a time when the mold closing is completed may translate to a distance to be corrected such that the tie bar screw 206 and the screws of half nuts 208 may mate properly with each other, and is determined automatically by a length $L_1$ of molds. For example, a distance $L_0$ from a mold attachment surface of the movable die plate 203 to a start point of cutting the tie bar screw 206 is predetermined, and thus the positions of peaks (or threads) and valleys of the screw can also be known in advance.

Meanwhile, with respect to the positions of peaks and valleys of the half nuts when the molds are closed and when the half nut attachment plate 210 is not moved horizontally, since the thickness $L_1$ of the molds, a length $L_2$ from a mold attachment surface of the fixed die plate 201 to a half nut attachment surface of the half nut attachment plate 210 are predetermined, so that the positions of peaks and valleys of the half nuts 208 can also be known in advance with calculation of the sum of $(L_1+L_2)$. Accordingly, comparing the positions of threads (peaks) of the screw in the tie bar 205 to the positions of valleys of the half nuts 208, a displacement from a proper mating position can be known. This is a value to be adjusted and determined as a moving amount of the half nut attachment plate 210. Namely, knowing only the mold thickness $L_1$, the corresponding amount of adjustment can be known automatically.

The above-described amount of adjustment, i.e., the displacement amount of the attachment plate 210 is determined by a distance $L_3$ from the mold attachment surface 203 of movable die plate 203 to the distal end of rod 221 of the mold thickness adjusting device 216. In this case, a pulse signal corresponding to the amount of adjustment is transmitted to a pulse motor 220 to rotate a screw 218. Thus, the rod 222 is moved to set a position of the attachment plate 210. Accordingly, in the mold closing operation immediately after attachment of molds, the distance $L_3$ is set at an original point. When a completely mold-closed state is reached, the mold thickness $L_1$ is detected by an automatic reading apparatus (not shown), calculating the amount of adjustment, projecting the rod 222 by driving the pulse motor 220, and moving the half nuts by the calculated distance. In this stage, the projected rod 222 may not be moved again as long as the same molds are used, so that it could effect opening-and-closing operations repeatedly while remaining in a fixed state. After the molds are closed and half nuts 208 are moved by the calculated distance, the half nuts 208 are closed together by an effect of the hydraulic cylinder 209.

Next, when supplying pressurized oil into the oil chamber 234 of oil hydraulic cylinder 231, the ram 232 is moved toward the half nut attachment plate 210 and pushes the plate at its distal end 232. Thus, the attachment plate 210 and the half nuts 208 are urged in the right direction, with the half nuts 208 meshing with the tie bar screw 206. In this way, a force for clamping the molds is generated.

When the molds are opened after the molding operation, the pressure in the oil chamber 234 of hydraulic cylinder 231 is lowered, and the half nuts 208 are opened by the effect of the hydraulic cylinder 209. Thereafter, when supplying pressurized oil on the side of the head of mold opening-and-closing cylinder 230, the movable die plate 203 is urged in the left direction to move the molds. At the same time, the half nut attachment plate 210 is moved toward the fixed die plate 201 by extension of the compression spring 215 and returns to its original position. In this case, besides the extension force of compression spring 215, the restoring force may be augmented positively by supplying pressurized oil into the oil chamber 235 of hydraulic cylinder 231. The tie bar screw 206 and half nuts 208 may be replaced by a plurality of circumferential grooves.

However, in the clamping machine disclosed in Japanese Patent No. 1996-5060, while adjustment of the mold thickness is facilitated as described above, the device has the following four problems.

(1) Since one end of each tie bar 205 is fixed securely to the movable die plate 203, the tie bar 205 should be drawn out from the fixed die plate 201 every time the die plate 203 is moved for a mold opening-and-closing operation during a molding cycle, the energy consumed is considerably large.

(2) The tie bars 205, when the molds are opened, are supported in a cantilever state by the movable die plate 203. Therefore, the tie bars may tend to bend in the operation.

(3) While the half nuts 208 for mating with the screw portion 206 of each tie bar 205 is provided on the side of the fixed die plate 201, the mold thickness adjusting device 216 is located on the side of the movable die plate 203. Displacement by a predetermined distance of a lower portion of the half nut attachment plate 210 using the rod 222 against a bias force of the spring 215 requires a complicated mechanism.

(4) The ram 232, which is a piston of the cylinder 231 for increasing the clamping pressure, presses the half nut attachment plate 210 at its right end on increasing the clamping pressure, and each tie bar 205 is moved in the right direction by the force transmitted thereto through the screw portion 206 mating with the half nuts 208, thus applying a clamping force to the movable die plate 203. However, when opening the molds after a product is molded, application of pressure to the ram 232 is stopped, and it is not involved in the initial mold-opening operation. Namely, including the initial mold-opening operation, the whole cycle for opening the molds is performed by the mold opening-and-closing cylinder 230. Since a considerably large force is required for the initial mold opening operation, a hydraulic cylinder which can generate a large power sufficient for moving the movable die plate 203 should be used as the cylinder 230.

We found that the above-mentioned problems can be solved by providing a construction such that one end portion of each tie bar is always connected with a fixed die plate, except of the operation for drawing out the tie bar on exchanging molds, in a straight-hydraulic mold clamping machine which applies a clamping force to molds using a clamping cylinder comprising annular pistons arranged on the side of the fixed die plate.

Accordingly, it is an object of the present invention to provide a new clamping machine which can perform a straight-hydraulic mold clamping and a tie-bar drawing-out operation in a reduced working space, and enables a shortened mold exchanging time, without using a drawing-out cylinder exclusively used for drawing out tie bars, by effecting retraction of a movable die plate and a tie-bar drawing-out operation simultaneously.

In order to accomplish the above-mentioned object of the present invention, the clamping system according to the present invention is provided mold opening and closing means for driving said movable die plate to advance to and retract from said fixed die plate; tie bars each extending through said movable die plate and said fixed die plate for guiding said movable die plate, and having a first engagement portion in which a groove is formed at a rear end on the side of said movable die plate and a second engagement portion in which a groove is formed at a front end on the side of said fixed die plate; a mold clamping cylinder including annular pistons in which said tie bars are fitted slidably and concentrically, first oil chambers each having a larger pressure receiving surface disposed on one side of each annular piston and generating a clamping force to clamp said fixed mold and movable mold subjected to a mold closing operation by an effect of pressurized oil supplied to the surface, and second oil chambers each having a smaller pressure receiving surface on the other side of each annular piston and generating an initial releasing force on an initial mold opening operation by an effect of pressurized oil supplied to the surface, and being incorporated in said fixed die plate; first connecting means disposed on an opposite side of a mold attachment surface of said fixed die plate, having half nuts for engaging with said first connecting portions on the side of said fixed die plate, for connecting distal ends of said tie bars to said die plate detachably; second connecting means disposed on an opposite side of a mold attachment surface of said movable die plate, having half nuts for engaging with said second connecting portions on the side of said movable die plate, for connecting rear ends of said tie bars to said movable die plate detachably; and force transmitting means for connecting said annular pistons of the mold clamping cylinder and said first connecting means so that these are moved together, and transmitting, in cooperation with said first connecting means, an initial releasing force for pushing said tie bars toward said movable die plate and a mold clamping force for drawing said tie bars toward said fixed die plate, to said tie bars in corresponding directions, respectively.

According to the present invention, since a drawing-out tie-bar operation is effected by a driving means which effects also mold opening-and-closing operations of a movable die plate, there is no need to provide a hydraulic cylinder exclusively used for drawing out tie bars, and the operational cost can be saved due to simplification of the mechanism.

A usual operation is carried out, with tie bars being connected to a fixed die plate, and the drawing-out operation of tie bars is effected only when molds are exchanged. The energy can be saved, and the tie-bar drawing-out operation can be started only by disengaging a distal end of each tie bar from each half nut, which is a first engaging means on the side of the fixed die plate. Thus, the time required for starting a mold exchanging operation can be greatly reduced.

In a drawing-in operation of tie bars after exchanging molds, an axial position of each tie bar can be set only by contacting a distal end of the tie bar with a stopper.

DETAILED DESCRIPTION OF THE PREFERRED EMBODIMENTS

Hereinafter, preferred embodiments of the present invention will be described with reference to FIGS. 1 to 7.

Figure 1:
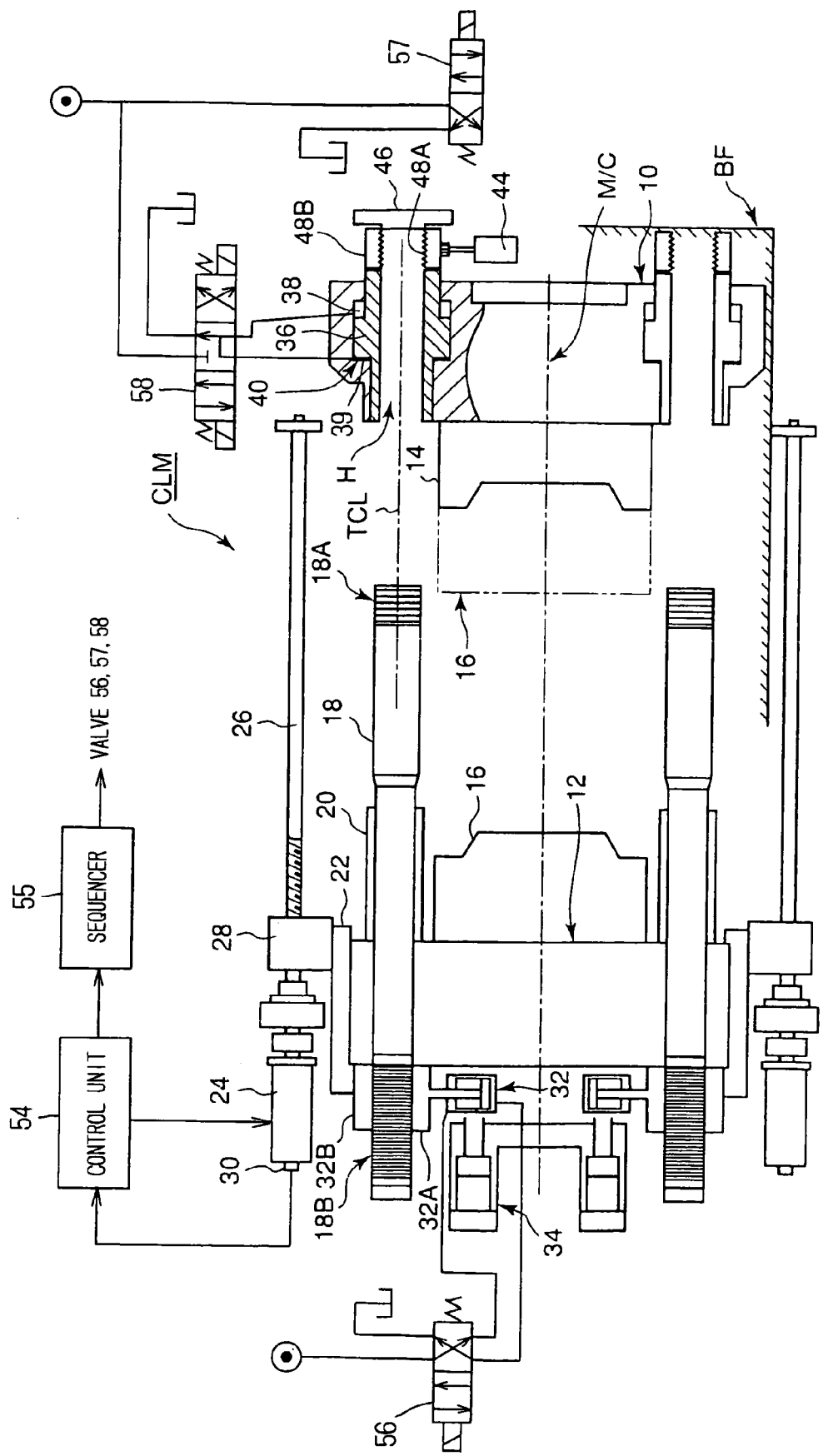
FIG. 1 is a plan view of a clamping system according to the present invention.

FIG. 1 is a plan view showing a clamping machine CLM according to an embodiment of the present invention. On a base frame BF, a fixed plate 10 and a movable plate 12 are arranged. A fixed mold 14 is attached to a mold attachment surface of the fixed die plate 10 which is standing on and fixed to the base frame BF. Facing the fixed die plate 10, a movable mold 16 is attached to a mold attachment surface of the movable die plate 12 which is slidable in a direction of the machinery central axis (M/C) or in opening and closing directions.

As illustrated in FIG. 1, since components shown above the machinery central axis M/C and corresponding components below the axis M/C are symmetrical, only the components shown above the axis M/C will be explained hereinafter.

Reference numeral 18 designates a tie bar. On the left side end of tie bar 18 an engagement portion 18B is provided, at which the tie bar 18 engages with a pair of half nuts 32A, 32B disposed on the side of movable die plate 12. The tie bar 18 extends through the movable die plate 12, and is slidable in the through hole. Further, on the right side end of tie bar 18 an engagement portion 18A is provided, at which the tie bar 18 engages with a pair of half nuts 48A, 48B disposed on the side of fixed die plate 10. Reference numeral 44 designates a hydraulic cylinder which open and close the half nuts 48A, 48B in a vertical direction to the machinery central axis M/C.

Reference numeral 20, as shown in the drawing, is a tie bar support guide for preventing the tie bar 18 from being in a cantilever position when it is drawn out from the fixed die plate 10 on exchanging molds. The tie bar support guide 20 is fixed horizontally to the movable die plate 12, and the tie bar 18 slides in the tie bar support guide. Reference numeral 34 is a hydraulic cylinder for driving a push pin (not shown) which separates a molded article remaining attached to the movable mold 16 after opening molds.

Reference numeral 26 designates a ball screw shaft which is driven to rotate by a servo motor 24. In the clamping system of this embodiment, an electric mold opening-and-closing mechanism is provided as a driving mechanism for driving the movable die plate 12. A ball nut 28 is fixed onto a support plate 22 which is attached to the movable die plate 12. The ball nut 28 engages with the ball screw shaft 26. The servo motor 24 is attached to a support frame (not shown) which is fixedly attached to the base frame BF.

Accordingly, with rotations of the ball screw shaft 26 driven by the servo motor 24 in both normal and reverse directions, the movable die plate 12 moves forward and backward in the machinery central axis direction, respectively, using the tie bar 18 as a guide through the ball nut 28.

Reference symbol TCL designates a central axis of the tie bar 18.

Next, clamping cylinder 40 is described. In this embodiment, a direct-hydraulic type cylinder 40 of a straight-hydraulic type is provided as a mechanism for generating a clamping force after closing molds. Reference numeral 36 is a piston of the clamping cylinder 40 disposed in the fixed die plate 10. Namely, the annular piston 36 has an aperture H which is formed concentrically with the central axis TCL of tie bar 18, and the tie bar 18 is inserted slidably in the aperture H. Reference numerals 38, 39 designate oil chambers of the clamping cylinder provided on both sides of the piston 36.

Abutting a right end face of the annular piston 36, a pair of half nuts 48A, 48B are disposed, which engage with the engaging portions 18 A of the tie bars 18, respectively. Each of the half nuts 48A, 48B is connected to a piston rod of a hydraulic cylinder 44. Engagement and disengagement of the half nuts 48A, 48B to the tie bar 18 is performed by moving these half nuts 48A, 48B forward and backward in a vertical direction to the central axis TCL.

In FIG. 1, reference numeral 30 denotes an encoder, which is a detector for discriminating and detecting a rotational amount and a rotational direction of the ball screw shaft 26, and a detected signal is fed back to a controller 54 to generate a signal related to a current position of the die plate 12 in the direction of machinery central axis M/C. Further, controller 60 receives the detected signal as a feedback information and performs a positional control and a speed control of the movable die plate 12. Reference numeral 55 is a sequencer which controls operations of the half nuts 32A, 32B, and half nuts 48A, 48B in accordance with an order predetermined in a series of molding cycles including mold opening-and-closing operations and clamping operations.

Reference numerals 56, 57 designate electromagnetic directional control valves, respectively. Among these valves, the directional control valve 56 is connected to the cylinder 32 for opening and closing the half nuts 32A, 32B on the side of movable die plate 12, respectively. On the other hand, the directional control valve 57 is connected to the cylinder 44 for opening and closing the half nuts 48A, 48B on the side of the fixed die plate 10, respectively. Further, reference numeral 58 is an electromagnetic directional control valve for controlling flow directions of pressurized oil which is supplied to the clamping cylinder 60.

Figure 2:
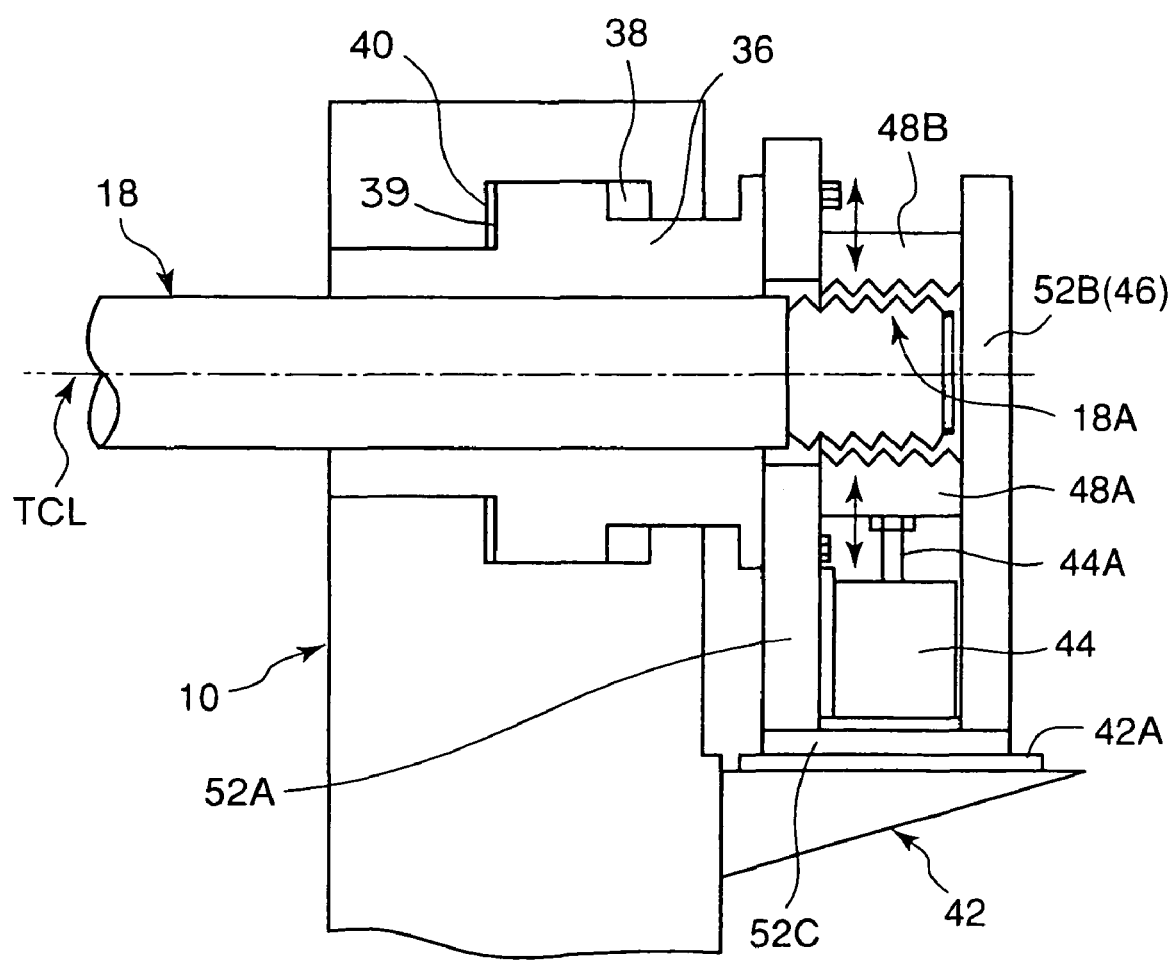
FIG. 2 is a view showing details of a mechanism of a connecting means shown in FIG. 1.
Figure 3A:
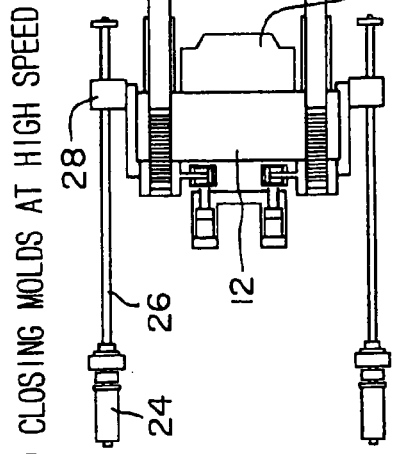
FIGS. 3A-3D are schematic diagrams of a clamping system, illustrating initial four states (designated by numerals 1 to 4) of one cycle including the mold operating and closing operations and mold clamping operation of a mold clamping system according to the present invention.
Figure 3B:
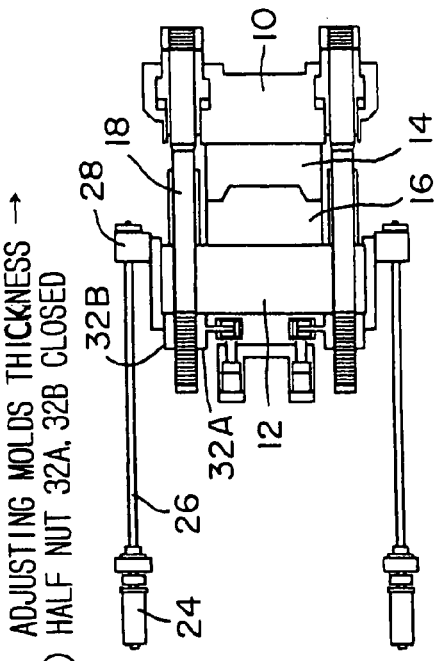
Figure 3C:
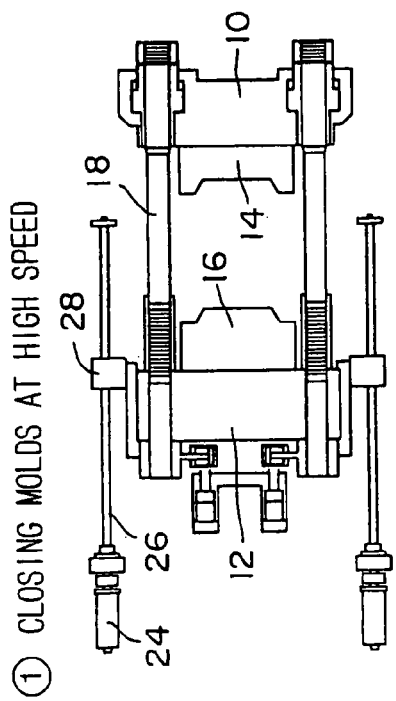
Figure 3D:
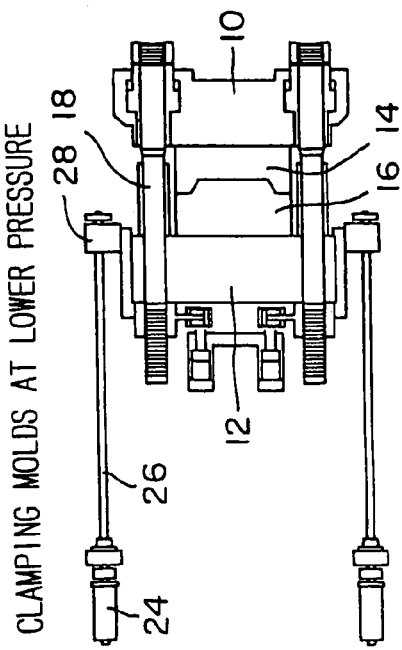
Figure 4A:
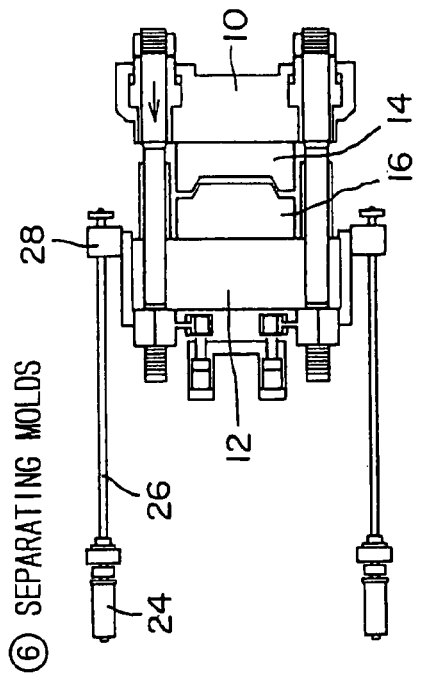
FIGS. 4A-4D are schematic diagrams of a clamping system, illustrating four states (designated by numerals 5 to 8) of one cycle including the mold operating and closing operations and mold clamping operation of a mold clamping system according to the present invention.
Figure 4B:
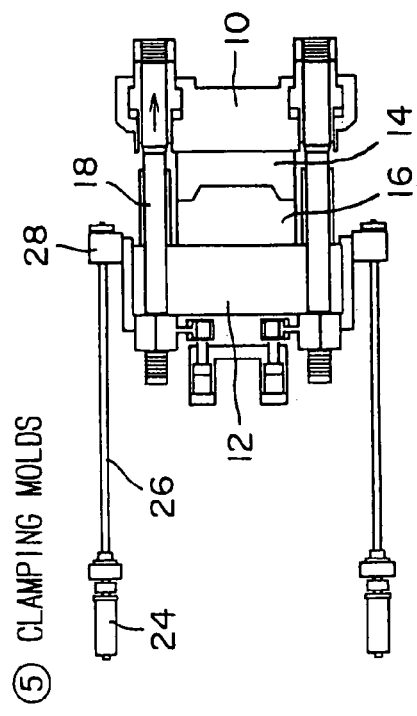
Figure 4C:
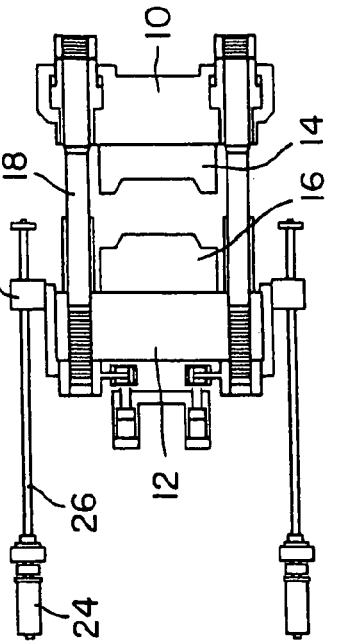
Figure 4D:
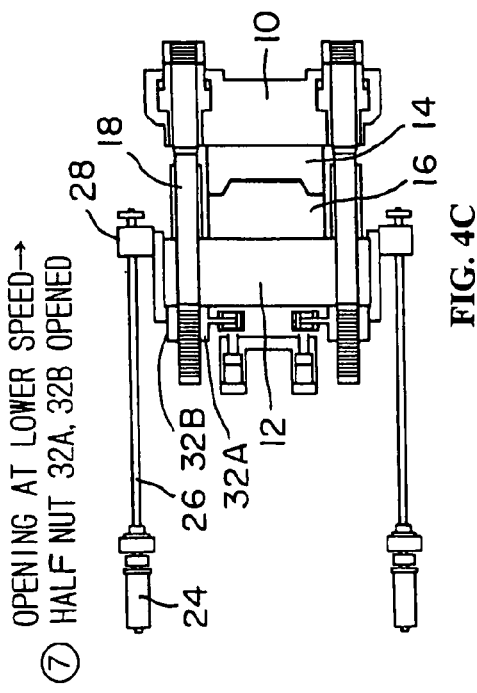

FIG. 2 illustrates details of a construction for coupling the half nuts 48A, 48b, which engage the engaging portion 18A of tie bar 18 on the side of fixed die plate 10 of FIG. 1, with the clamping cylinder 40 integrally, and for transmitting a clamping force and a releasing force on an initial operation for opening molds to the tie bar in the respective directions.

Namely, in FIG. 2, a plate 52A is fastened to an end face of piston 36 using a bolt. A plate 52B is arranged in parallel to the plate 52A with a space therebetween. These plates 52A, 52B are fixed to a plate 52C to maintain a space such that the half nut 48B can contacts slidably with the opposite surfaces of plates 52A, 52B, respectively. Further, the whole structure including these plates 52A, 52B, 52C is attached movably to the fixed die plate 10 via a guide 42A on a rack 42 which is secured horizontally to the die plate 10, thereby to move in the axis TCL of tie bar 18 along the guide 42A. In this case, similar to plate 46 shown in FIG. 1, after exchanging molds and when the tie bar 18 is inserted into the movable die plate 10, the plate 52B contacts with an end face of tie bar 18 and serves as a stopper for restricting a position of tie bar 18 in the axial direction.

Next, in FIG. 2, the operation of clamping cylinder 40 is described. In this case, it is assumed that an end face of the engagement portion 18A of tie bar 18 is in contact with the plate 52 B, with the half nuts 48A, 48B engaging with the engagement portion 18A.

When the movable mold 16 is contacted with the fixed mold 14 and the clamping pressure is further increased, an pressurized oil is supplied to the oil chamber 39. Oil pressure in the oil chamber 39 applies to an end face of the annular piston 36 to generate a force for moving the annular piston 3 in the right direction. The force is then transmitted, as a clamping force, to the half nuts 48A, 48B through the plate 52A, so that the tie bar 18 is drawn and extends into the fixed tie plate.

On the other hand, in order to release the movable mold 16 from the fixed mold 14 after steady clamping, an initial operation for applying a relatively great force to the movable die plate 12 via the tie bar 18. When molds are opened, pressurized oil is first supplied to oil chamber 38, and a releasing force (opening force) is generated by the effect of the pressurized oil on the end face of annular piston 36, thereby moving the annular piton 36 in the left direction. This force is transmitted to the half nuts 48A, 48B interposed between the plates 52B, 52C, then to the tie bar 18, so that the tie bar 18 is urged toward the movable die plate 12. In this state, comparing the end face on the side of oil chamber 38 and that on the side of oil chamber 40, the latter has a larger area for receiving a pressure. Therefore, it has a larger clamping force, and a difference is given between the clamping force and the releasing force.

In the engagement portions 18A, 18B of tie bar 18 and the corresponding engagement portions of half nuts 32A, 32B and 48A, 48b, grooves having a sawtooth-like or square-wave shape are formed.

FIGS. 3 to 5 are schematic plan views of a clamping system, illustrating representative eleven operations (designated by numerals 1 to 13) in one cycle of the mold opening and closing operations and mold clamping operation according to the present invention shown in FIG. 1. As shown throughout the eleven drawings, the half nuts 48A, 48B on the side of fixed die plate 10 are always kept to engage with the engagement portions 18A of the tie bars, respectively.

In FIGS. 3A-3D, among operations 1 to 4, the die plate 12 starts to advance from a position shown in operation 1. In this operation, each ball screw 26 is rotated at a high speed by the servo motor 24, so that a mold closing operation, in which the movable die plate 12 is transferred at a high speed, is performed. When the movable die plate 12 reaches a predetermined position shown in operation 2, the rotational speed of servo motor 24 is lowered, and the operation is switched to a low speed mold closing operation. This switching of the mold closing operation from a high speed to a low speed is conducted by the controller 60 in FIG. 1.

Next, the low speed mold closing operation proceeds, and immediately before the movable mold 16 contacts with the fixed mold 14 as shown in operation 3, the state is changed from a low pressure clamping state to a mold contact state. In this state, the servo motor 24 is stopped, and the mold closing movement of movable die plate 12 is ended.

Operation 4 illustrates a mold thickness adjustment which is conducted first after exchanging molds. In this operation 4, the engagement portions 18B of tie bars 18 and the half nuts 32A, 32B remain disengaged before the mold thickness adjustment. In the mold thickness adjustment, after contacting both molds together, the position of each tie bar 18 is finely adjusted to match grooves of the engagement portion 18 with phases of the half nuts 32A, 32B, respectively, by slightly moving annular piston 36 of each clamping cylinder 40. This operation is performed with a monitor using a sensor (not shown). The sensor detects a relative position(s) between the engagement portion 18B of tie bar 18 and the half nuts 32A, 32B, and disposed in the vicinity of engagement portion 18B, for example. After confirmation of the mold thickness adjustment, the sequencer 55 switches the magnetic directional control valve 56 to close the half nuts 32A, 32B. Thereafter, the engaged state between the half nuts 32A, 32B and the engagement portion 18B remain until opening the molds.

Next, FIGS. 4A-4D and FIGS. 5A-5C show a series of operations of a molding cycle from clamping to removal of a molded article, respectively.

Figure 5A:
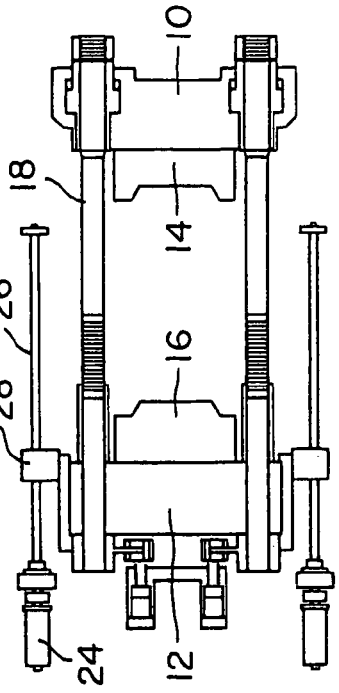
FIGS. 5A-5C are diagrams illustrating three states (designated by numeral 9 to 11) of one cycle including the mold operating and closing operations and mold clamping operation of a mold clamping system according to the present invention.
Figure 5B:
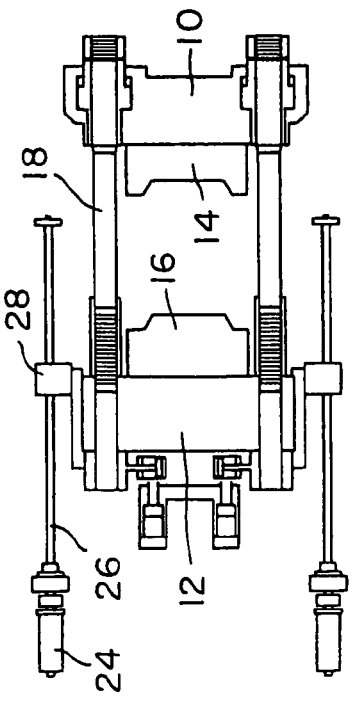
Figure 5C:
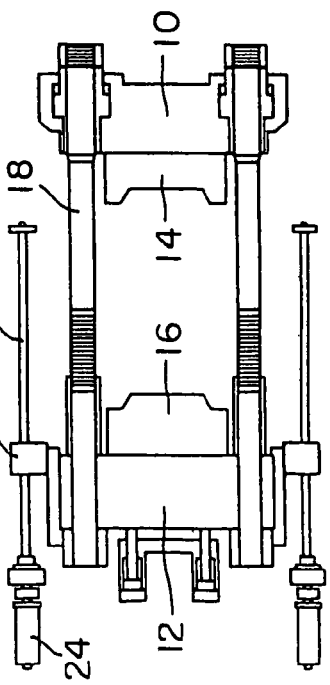

In operation 5 of FIGS. 5A-5C, in order to carry out a mold clamping as stated above, pressurized oil is supplied to oil chamber 39 of each clamping cylinder 40, and the annular piston 36 moves in a direction designated by an arrow to elevate the pressure and keep the mold clamping state. Then, injection filling of a molding material into a cavity defined by the molds is conducted. After a molded article is solidified in the cavity, the supply of pressurized oil into the oil chamber is stopped, and pressure release in the clamping cylinder 40 is conducted. In operation 6, in order to remove the molded article, pressurized oil is supplied to each oil chamber 38 to carry out an initial operation for opening the molds. As stated above, the annular piston 36 moves in a direction designated by an arrow, and a releasing force is transmitted to the tie bars 18 to pull the movable die plate 12 in the left direction. In this way, the movable mold 16, which cohered to the fixed mold due to the mold clamping, is separated from the fixed mold. Then, until the movable mold 16 is separated completely from the fixed mold, the high pressure mold opening operation is continued.

During the above high pressure mold opening operation, the servo motor 30 is kept in a state to enable a torque-free rotation. With retraction of the movable die plate 12, each ball nut 28 rotates the ball screw shaft 26, and the servo motor 30 rotates with the rotation of the ball screw shaft 26 without resistance. In this way, the movable mold 16 is retracted by the initial operation, and molds are opened by a predetermined amount.

Thereafter, in operation 7, a mold opening operation due to an electric mold opening-and-closing mechanism, which is driven by the servo motor 30, is ready to start. In this case, the sequencer 55 shown in FIG. 1 switches the electromagnetic directional control valve 58 to stop the supply of pressurized oil to the oil chamber 38 of clamping cylinder 40, while switching the electromagnetic directional control valve 56 to open the half nuts 32A, 32B on the side of movable die plate 12 and disengage the tie bars 18 from the movable die plate 12. In this state, the fixed die plate 10 and the tie bars 18 are kept to connect with each other by the half nuts 48A, 48B.

Next, in operation 8, the servo motor 30 starts, and the operation is changed to a low speed mold opening operation. Since distal ends of the tie bars are fixed to the fixed die plate 10, the movable die plate 12 is retracted, sliding around the tie bars 18. When the movable die plate 12 is retracted to a position shown in the operation 8, the rotational speed of servo motor 30 is switched to a high speed, and the operation is changed to a high speed mold opening operation. In FIGS. 5A-5C, when the movable die plate 12 comes near a retracted position shown in operation 9, the operation is changed to a low speed mold opening operation again, and is stopped a predetermined position shown in operation 10. Thereafter, as shown in operation 11, a molded article remaining in the movable mold 16 is pushed out using a push pin by the effect of cylinder 34 and separated from the movable mold 16. Then, until an instruction to start a next molding cycle is given from the sequencer 55, cavities in both of the molds are subjected to spray and air blow processes. In subsequent cycles, since the mold thickness adjusting operation in step 4 is not required, the other operations 1 to 3 and 5 to 11 will be repeated.

Figure 6A:
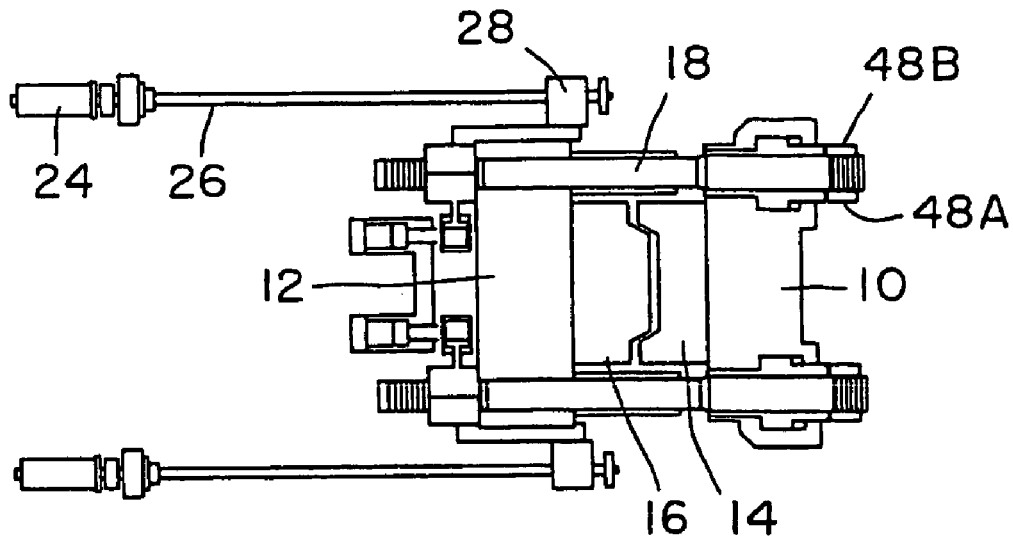
FIGS. 6A-6B are schematic diagrams of a mold clamping system, illustrating two states (designated by numerals 12, 13) of tie bars being drawn out.
Figure 6B:
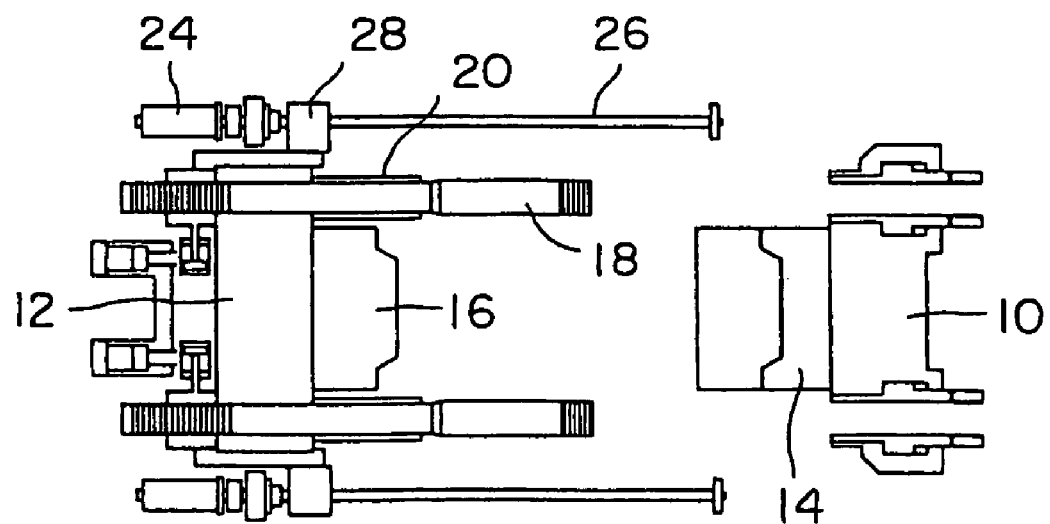
Figure 7:
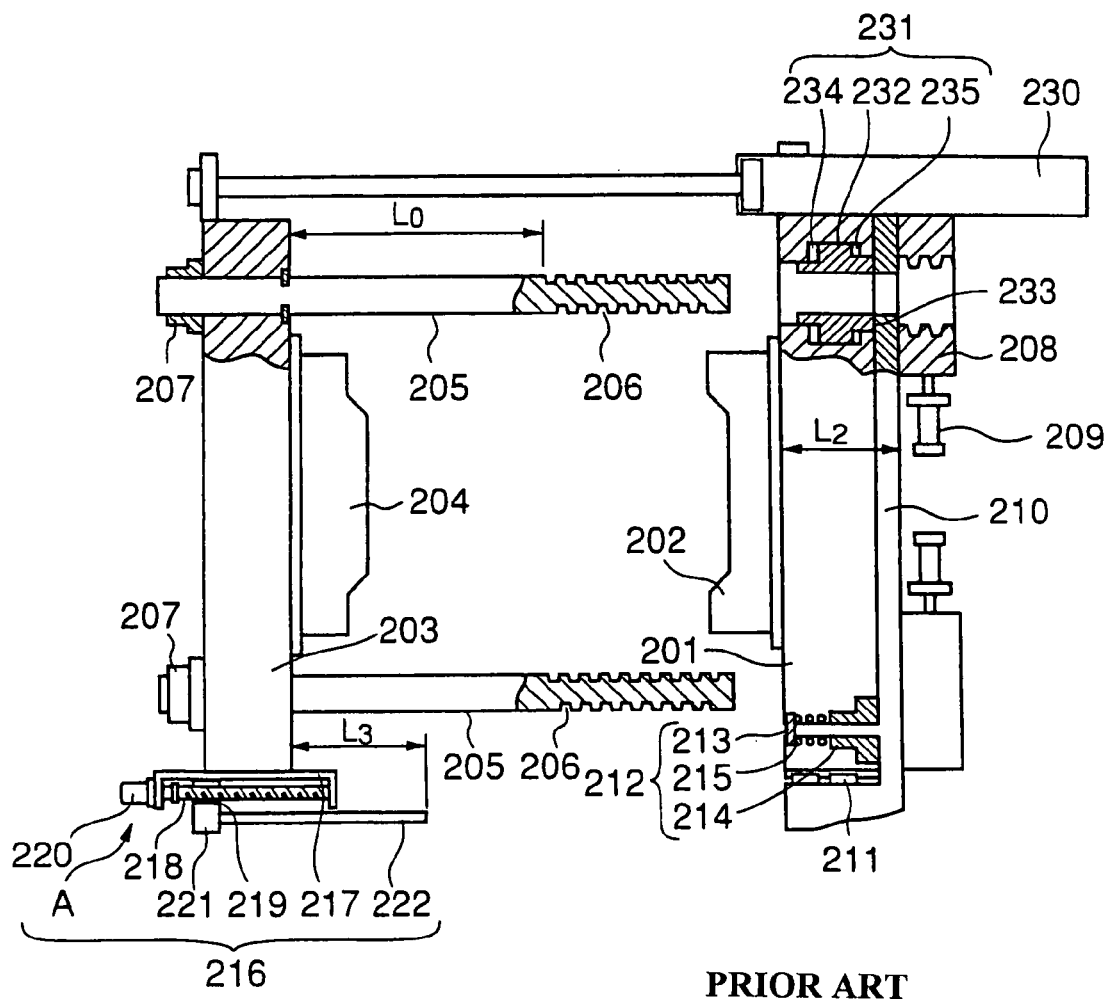
FIG. 7 is a front view of a mold clamping system, illustrating a state of tie bars having been drawn out from a fixed die plate in a conventional mold clamping system.
Figure 8:
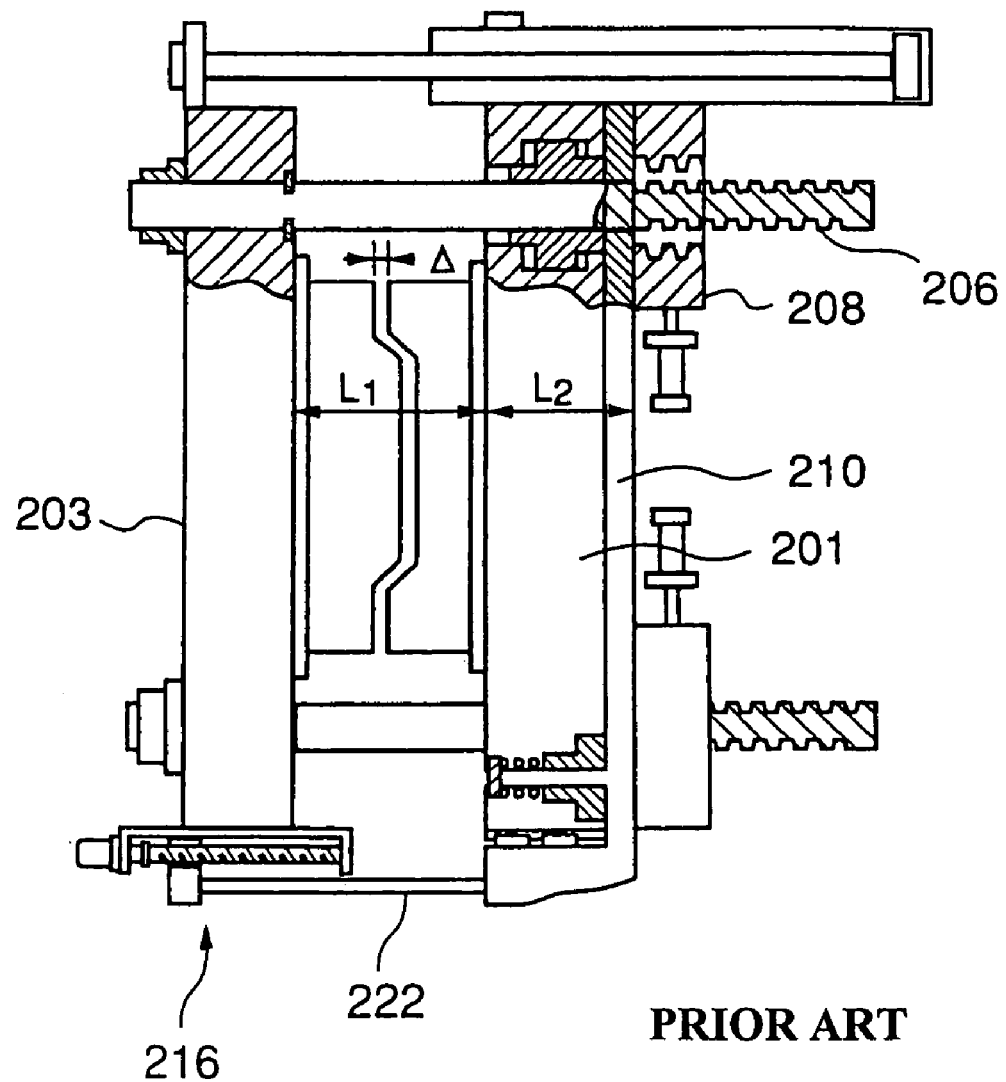
FIG. 8 is a view showing a state immediately before closing molds in the mold clamping system of FIG. 7.

Next, in FIGS. 6A-6B, operations 12, 13 are different from the molding cycle comprising operations 1 to 11, and show operations for exchanging used molds to new ones.

Operation 12 shows a position of the movable die plate 12 before starting to exchange molds. In order to pull out the tie bars 18 from the fixed die plate 10 by moving the movable die plate 12, the sequencer 55 shown in FIG. 1 switches the electromagnetic directional control valves 56, 57 to change the engagement state between the half nuts 32A, 32B and 48A, 48B and the tie bars 18 to a state (described below) different from that of the molding cycle. Namely, the half nuts 48A, 48B on the side of fixed die plate 10 are opened to disengage from the engagement portions 18A, respectively. Along with this operation, the half nuts 32A, 32B on the side of movable die plate 12 are closed to engage with the engagement portions 18B. Thereafter, as shown in operation 13, the movable die plate 12 is retracted together with the tie bar 18 due to the ball screw shaft 26 driven by the servo motor 30. With the retraction of movable die plate 12, the tie bars 18 are drawn out from the fixed die plate. As shown in the state 13, during the retraction to a position where mold exchanging is carried out, since the weight of each tie bar is supported by the support guide 20, flexure of the tie bars can be prevented.

In FIG. 1, when a mold exchanging work is completed, the movable die plate 12 advances, and is inserted in the fixed die plate 10 until the distal end of each tie bar 18 contacts with the stopper 46. Then, the half nuts 48A, 48B mate with the engagement portions 18A, and the half nuts 32A, 32B disengage from the engagement portions 18B, respectively. Thereafter, from the state shown in operation 1, a series of operations including mold closing, mold thickness adjustment, mold clamping, molding a molded article, and mold opening will be repeated.

What is claimed is:

1. A mold clamping system for use in a molding machine for molding a molded article using a mold comprising a fixed mold and a movable mold, which includes a base frame, a fixed die plate which is fixed onto the base frame and to which the fixed mold is attached, and a movable die plate which faces the fixed die plate and is arranged movably on the base frame and to which the movable mold is attached, the mold clamping system comprising:

mold opening and closing means driven by an electric motor for driving said movable die plate to advance and retract from said fixed die plate;

tie bars each extending through said movable die plate and said fixed die plate for guiding said movable die plate, and having a first engagement portion in which a groove is formed at a rear end on the side of said movable die plate and a second engagement portion in which a groove is formed at a front end on the side of said fixed die plate;

a mold clamping cylinder being incorporated in said fixed die plate and including one or more annular pistons having an end portion protruding from the rear side of the fixed die plate, wherein the mold clamping cylinder is configured to adjust the mold thickness, in cooperation with a first and a second connecting means;

said first connecting means disposed on an opposite side of a mold attachment surface of said fixed die plate, having half nuts for engaging detachably with said second engagement portion on the side of said fixed die plate, configured to keep said front ends of said every tie bars connected to said fixed die plate during a mold opening and closing operation, and molds clamping operation;

said second connecting means disposed on an opposite side of a mold attachment surface of said movable die plate, having half nuts for engaging detachably with said first engagement portion on the side of said movable die plate, configured to selectively connect or disconnect said rear ends of said every tie bars to said movable die plate detachably; and force transmitting means, disposed on the fixed die plate and configured to connect said one or more annular pistons of the mold clamping cylinder and said first connecting means so that these are moved together, wherein the force transmitting means includes a first plate which has a side face fastened to the end portion of the annular pistons and another side face on which one end face of each half nut is disposed slidably, a second plate arranged in parallel to said first plate and having one side face on which the other end face of each half nut is disposed slidably, and a third plate to which said first and second plates are fixed and which is movable in an axial direction of the corresponding tie bar, and wherein the force transmitting means is adapted to be moved together with the clamping cylinder with the half nuts of the first connecting means engaging with the second engagement portion of the tie bars, and to transmit, in cooperation with the first connecting means, an initial releasing force for pushing the tie bars toward the movable die plate and a mold clamping force for drawing the tie bars toward the fixed die plate, to the tie bars in corresponding directions, respectively.

2. The mold clamping system according to claim 1, wherein each mold opening and closing means includes a ball screw shaft, a ball nut and a servo motor for driving said ball screw shaft, said ball nut being fixed to said movable die plate.

3. The mold clamping system according to claim 1, wherein each first connecting means opens and closes said half nuts in a vertical direction to an axis of each tie bar, and includes an actuator for keeping a mated state with each second engagement portion and releasing the mated state.

4. The mold clamping system according to claim 1, wherein each second connecting means opens and closes said half nuts in a vertical direction to an axis of each tie bar, and includes an actuator for keeping a mated state with each first engagement portion and releasing the mated state.

5. The mold clamping system according to claim 1, wherein said second plate also serves as a stopper for restricting a position of one end face of said second engagement portion of the corresponding tie bar.

6. The mold clamping system according to claim 1, further comprising a sequence control means for making said half nuts of each second connecting means disengage with said first engagement portion of each tie bar when the movable mold is opened or closed, and making said half nuts of each second connecting means engage with said first engagement portion of each tie bar when the movable mold is clamped to the fixed mold, while keeping said half nuts of the first connecting means to engage with said second engagement portion of each tie bar, and controlling a mold operating and closing operation during a molding cycle.

7. The mold clamping system according to claim 6, wherein when the all tie bars are pulled off from the fixed die plate for exchanging used molds to new ones, said sequence control means controls operations such that engagement between said half nuts of each second connecting means and said first engagement portion of each tie bar is released, while said half nuts of each first connecting means engage with said second engagement portion of each tie bar.

8. The mold clamping system according to claim 1, wherein said first engagement portion and said second engagement portion comprise a plurality of grooves having a successive sawtooth-like or square-wave shape with a predetermined pitch along the axial direction of each tie bar, respectively, said mold clamping cylinder is capable to move the first engagement portion to adjust relative positions to said half nuts of the second connecting means so as to make said half nuts mate with said grooves of the first engagement portion, when the molds are exchanged.

9. The mold clamping system according to claim 1, further comprising support members fixed to said movable die plate, wherein said tie bars are inserted slidably in said movable die plate and supported by said support members horizontally.

10. The mold clamping system according to claim 1, wherein said mold clamping cylinder includes one or more annular pistons in which said tie bar is fitted slidably and concentrically, a first oil chamber having a larger pressure receiving surface disposed on one side of the one or more annular pistons and generating a clamping force to clamp said fixed mold and movable mold subjected to a mold closing operation by an effect of pressurized oil supplied to the surface of the first oil chamber, and a second oil chamber having a smaller pressure receiving surface than the receiving surface of the first oil chamber on the other side of the one or more annular pistons and generating an initial releasing force on an initial mold opening operation by an effect of pressurized oil supplied to the smaller pressure receiving surface of the second oil chamber.

* * * * *